(12) United States Patent
Cunkelman

(10) Patent No.: US 6,474,748 B1
(45) Date of Patent: Nov. 5, 2002

(54) ELECTRONIC VENT VALVE

(75) Inventor: Brian L. Cunkelman, Blairsville, PA (US)

(73) Assignee: Westinghouse Air Brake Company, Wilmerding, PA (US)

( * ) Notice: Subject to any disclaimer, the term of this patent is extended or adjusted under 35 U.S.C. 154(b) by 0 days.

(21) Appl. No.: 09/369,986

(22) Filed: Aug. 6, 1999

(51) Int. Cl.$^7$ .................................................. B60T 11/32
(52) U.S. Cl. .............................. 303/81; 303/7; 303/15; 303/20
(58) Field of Search ............................. 303/7, 15, 20, 303/81, 82, 86, 33, 57, 68

(56) References Cited

U.S. PATENT DOCUMENTS

| | | | | |
|---|---|---|---|---|
| 4,842,341 A | * | 6/1989 | Vaughn et al. ................. | 303/82 |
| 5,350,222 A | * | 9/1994 | Carroll .......................... | 303/82 |
| 5,494,342 A | * | 2/1996 | Engle ............................ | 303/81 |
| 5,722,736 A | * | 3/1998 | Cook ............................ | 303/15 |
| 5,788,338 A | * | 8/1998 | Hart et al. ..................... | 303/81 |
| 6,017,098 A | * | 1/2000 | Kettle, Jr. et al. ............ | 303/86 |

* cited by examiner

Primary Examiner—Jack Lavinder
Assistant Examiner—Robert A. Siconolfi
(74) Attorney, Agent, or Firm—James Ray & Associates

(57) ABSTRACT

An electronic vent valve for an electronically controlled pneumatic (ECP") braking system having a plurality of braking sites at which a braking force can be applied. The ECP braking system includes a master controller processing circuit, individual braking control units located proximate each of the braking sites and a brake pipe supplying compressed air to the braking sites. The electronic vent valve is in fluid communication with the compressed air carried by the brake pipe and has an open position for substantially venting the compressed air from the brake pipe and a closed position for substantially retaining the compressed air within the brake pipe. The electronic vent valve includes a control circuit for causing the valve to open during emergency braking operations, thereby assuring a rapid decrease in the brake pipe pressure. The control circuit preferably includes a brake pipe pressure sensor and a microprocessor for calculating a rate of change of the brake pipe pressure (dP/dt) and for causing the valve to open whenever the calculated rate of change of brake pipe pressure exceeds a threshold value. The control circuit can additionally cause the valve to open in response to a direct command from the master controller and can transmit to the master controller various operational characteristics of the braking system and the microprocessor itself.

12 Claims, 5 Drawing Sheets

ELECTRONIC VENT VALVE

CROSS-REFERENCES TO RELATED APPLICATIONS

The present application is directed to similar subject matter as is disclosed in U.S. patent application Ser. No. 09/044,352 filed on Mar. 19, 1998 by Angel P. Bezos and entitled "Improved AAR Compliant Electronic Braking System" and in U.S. patent application Ser. No. 09/215,985 filed on Dec. 18, 1998 by Robert C. Kull and entitled "Locomotive to ECP Brake Conversion System", now U.S. Pat. No. 6,189,980, issued on Feb. 20, 2001. The subject matter disclosed in the above cross-referenced U.S. patents and patent applications is hereby expressly incorporated by reference with the same effect as if fully set forth herein

FIELD OF THE INVENTION

The present invention relates, in general, to pneumatic braking systems such as are typically employed on rail transport vehicles (e.g., trains) and other relatively large wheeled transport vehicles (e.g., heavy trucks). More particularly, the present invention relates to a so-called "electronically controlled pneumatic" (hereinafter "ECP") type of braking system for such vehicles, most particularly ECP braking systems for trains and other rail transport vehicles.

BACKGROUND OF THE INVENTION

The principles of a pneumatic braking system are well understood by those of ordinary skill in the relevant art. Typically, an onboard air compressor furnishes and replenishes as necessary compressed air to the system. A so-called "main reservoir" is typically employed to maintain a substantially constant feed pressure to the system downstream thereof. The main reservoir is recharged by the onboard compressor whenever its pressure drops below a predetermined level.

A train "consist" is formed of a number of related railcars linked end to end. The main reservoir, normally located in a forward locomotive along with the compressor, feeds a pneumatic line, commonly referred to as a "brake pipe" which typically extends the length of the train. In the formation of a train consist, the individual brake pipe sections located on each individual railcar are linked together through pneumatic couplings. On each individual railcar, a "branch pipe" supplies compressed air from the brake pipe running the length of the train to the individual braking components of the individual railcar, which typically include a so-called "AB-Type control valve" (also sometimes referred to as a "triple valve"), an "auxiliary reservoir", an "emergency reservoir" and the brake cylinders of the railcar. [Examples of AB-Type control valves are the ABD, ABDX and ABDW control valves currently or previously manufactured by Westinghouse Air Brake Company, i.e., "WABCO".] During times when the brakes are "released" (e.g., no braking force being applied), compressed air from the pneumatic brake pipe is supplied via the branch line to maintain a predetermined compressed air charge within the auxiliary and emergency reservoirs of each railcar in the train consist. In some designs, a so-called "combined auxiliary and emergency reservoir" is provided on a railcar. The brakes on an individual railcar are applied by supplying compressed air from at least the auxiliary/emergency reservoir(s) located on the railcar to the brake cylinders of the railcar. The compressed air displaces the pistons of the brake cylinders to apply a mechanical braking force to the wheels of the railcar.

In the conventional pneumatic braking system, as originally developed, the only means for actuating the transfer of compressed air from the auxiliary/emergency reservoir(s) to the brake cylinders is through the brake pipe itself. An engineer or other operator lowers the brake pipe pressure, e.g., by manipulating a brake lever on a brake control panel located in the locomotive. For example, the brake pipe pressure can be lowered by venting the brake pipe to atmosphere in response to movement of a control handle by the engineer.

The AB-Type control valves located on each individual railcar are constructed such that they respond to a lowered brake pipe pressure by supplying compressed air from at least the auxiliary reservoir located on each railcar to the brake cylinders of the railcar, thereby applying the brakes of the railcar. The amount of air pressure supplied from the auxiliary reservoir to the brake cylinders by the AB-Type control valves is proportional to the amount by which the brake pipe pressure is lowered by the engineer. Typically, the control handle allows the engineer to apply a continuously variable braking force beginning with a so-called "release" position (in which the brake pipe pressure is at a maximum and the braking pressure applied at the individual railcars is therefore at a minimum, e.g., the brakes are released), through a "minimum service" brake application, a "full service" brake application and ultimately to an "emergency" brake application (in which the brake pipe pressure is at a minimum and the braking pressure applied at the individual railcars is therefore at a maximum). Other braking applications may be available to the engineer such as suppression and continuous service, but the principle is basically the same, namely, that the engineer's movement of the braking control handle lowers the brake pipe pressure, and the AB-Type control valves located in the individual railcars respond by supplying air from the auxiliary/emergency reservoir(s) located on the individual railcars to the brake cylinders proportionately according to the degree by which the brake pipe pressure is lowered by the engineer.

When the engineer moves the control handle to the "emergency" position, the brake pipe pressure is precipitously reduced. As is well understood in the art, the individual AB-Type control valves on the individual railcars are constructed such that, when the brake pipe pressure drops below a determined pressure, the AB-Type control valves transfer compressed air from both the auxiliary and emergency reservoirs on each railcar to the brake cylinders of the railcar, resulting in a greater mechanical braking force being applied than in a service braking application, wherein only compressed air from the auxiliary reservoirs is supplied to the brake cylinders.

One advantage of the above-described conventional pneumatic braking system is that it provides a "fail safe" mechanism. Since the brakes at the individual railcars are applied in response to a decrease in brake pipe pressure, a rupture of the brake pipe, a failure of the compressor, etc. results in the brakes being applied and not in a brake failure. In view of the dire consequences of brake failure on a railway train, it is understandable that pneumatic braking development has been characterized by the fail safe concept.

However, a limitation of such a conventional pneumatic braking system described above that has been long appreciated is the delay in braking that occurs as the change in brake pipe pressure propagates along the length of a train. For example, it has been estimated that a brake pipe pressure drop in a freight train of approximately one mile in length may take about one minute to travel the length of the train if it is a service brake application and about one-half minute if it is an emergency brake application.

To overcome this limitation, so-called "electronically controlled pneumatic" (or "ECP") braking systems have been developed. ECP braking systems also utilize the concept of control valves located on each railcar which transfer previously stored compressed air from auxiliary/emergency reservoir(s) located on the railcars to the brake cylinders thereof to generate a braking force. However, in an ECP braking system, the control valves can be electrically actuated (i.e., through electropneumatic valves). Therefore, signals to the railcar control valves are transmitted at least electrically, rather than only through the brake pipe pressure, thereby substantially eliminating the propagation delay along a long freight train mentioned above.

In a typical implementation of an ECP braking system on a freight train, the lead locomotive is provided with a master controller (e.g., microprocessor controlled) which receives input data signals describing the degree of braking application applied by the engineer via the brake control handle. The master controller then formulates braking commands for the railcars and sends electrical braking command signals to individual car control units or "CCU"s (e.g., also microprocessor controlled) located on each individual railcar which describe the degree of braking to be applied by each individual railcar. The electrical braking command signals sent by the master controller typically describe the braking application in terms of a percentage of the pressure required for a full service brake application, for example, with 0% indicating a release of brakes, 15% indicating a minimum service brake application, 100% indicating a full service brake application and 120% indicating an emergency brake application.

The communication signals between the master controller and the individual CCU's are typically conveyed by an electrical communication line (e.g., an "electrical trainline") which runs from railcar to railcar throughout the length of the train. Like the pneumatic brake pipe, the electrical trainline consists of a sequential series of individual segments which are joined end to end during the formation of a train consist.

In order to provide for a redundant or fail safe manner of operation, the pneumatic braking system is frequently retained on trains having an ECP braking system implementation. For example, the ECP electrical trainline may be employed to communicate both service and emergency braking applications to the individual railcars, while the pneumatic brake pipe may be employed to communicate only backup emergency braking applications to the individual railcars.

As noted above, during an emergency braking operation, the brake pipe pressure is dropped as rapidly as possible, since it is the severely reduced brake pipe pressure which initiates the transfer of compressed air from both the auxiliary and emergency reservoirs to the brake cylinders. However, on long trains, particularly long freight trains, brake pipe pressure changes, even an emergency brake pipe pressure reduction, can take up to one-half minute to propagate the length of the train.

The present invention is directed to producing a very rapid drop in the brake pipe pressure upon the detection of conditions indicating that an emergency brake application has been initiated. The present invention is particularly adapted to use in conjunction with an ECP type of braking system. However, the present invention could also be used in conjunction with the conventional type of pneumatic braking system described above.

OBJECTS OF THE INVENTION

One object of the present invention is the provision of an electronic vent valve for attachment to the brake pipe of an electronically controlled pneumatic braking system for quickly and precipitously lowering the brake pipe pressure in response to a received electrical signal indicating the initiation of an emergency braking condition, thereby ensuring that the control valve of the pneumatic braking system will respond to the rapidly lowered brake pipe pressure by supplying an appropriate compressed air charge from the onboard auxiliary/emergency reservoirs to the brake cylinders so as to initiate the desired emergency braking action.

Another object of the present invention is the provision of such an electronic vent valve which is additionally capable of monitoring the existing brake pipe pressure and opening the vent valve in response to a negative rate of change in the brake pipe pressure (dP/dt) that exceeds a threshold rate of pressure change determined to be indicative, in and of itself, of an emergency braking condition.

A further object of the present invention is the provision of such an electronic vent valve which can, upon determining the existence of an emergency braking condition, perform optional emergency subroutines, such as, for example, determining subsequent rates of change of brake pipe pressure (dP/dt) and reporting such rates of change of brake pipe pressure to a master controller unit, actuating appropriate warning indicators, attempting to reactuate the vent, etc.

A still further object of the present invention is the provision of such an electronic vent valve which is capable of performing periodic test subroutines to determine whether it is in proper operational condition.

A yet further object of the present invention is the provision of such an electronic vent valve that is reliable in operation and efficient in manufacture.

In addition to the objects and advantages of the present invention described above, various other objects and advantages of the invention will become more readily apparent to those persons skilled in the relevant art from the following more detailed description of the invention, particularly when such description is taken in conjunction with the attached drawing Figures and with the appended claims.

SUMMARY OF THE INVENTION

In one aspect, the invention generally features an electronically controlled vent valve for a pneumatic brake system, the pneumatic brake system including a brake pipe carrying compressed air, the electronically controlled vent valve including a valve for connecting to the brake pipe and for being in fluid communication with the compressed air carried by the brake pipe, the valve having an open position for substantially venting the compressed air from the brake pipe and a closed position for substantially retaining the compressed air within the brake pipe, an electrically operated actuator for moving the valve between the open position and the closed position and a control circuit for controlling the electrically operated actuator to move the valve between the open position and the closed position.

In another aspect, the invention generally features an electronically controlled vent valve for an electronically controlled pneumatic braking system, the electronically controlled pneumatic braking system having a plurality of braking sites at which a braking force can be applied, the electronically controlled pneumatic braking system including a master controller processing circuit for generating and supplying electrical braking command signals and an individual braking control unit located proximate each of the plurality of braking sites for receiving the electrical braking command signals generated and transmitted by the master controller processing circuit, the electronically controlled pneumatic braking system further including a brake pipe supplying compressed air to the plurality of braking sites, the electronically controlled vent valve including a valve housing for connecting to the brake pipe and for receiving the compressed air from the brake pipe, a valve member disposed within the valve housing, the valve member having an open position for substantially venting the compressed air from the valve housing and a closed position for substantially retaining the compressed air within the valve housing, an electrically operated actuation mechanism for moving the valve member between the open and closed positions and an electronic control circuit for controlling the electrically operated actuation mechanism to thereby cause the valve member to move between the open and closed positions.

The present invention will now be described by way of a particularly preferred embodiment, reference being made to the various Figures of the accompanying drawings.

DETAILED DESCRIPTION OF THE PREFERRED EMBODIMENT

Figure 1:
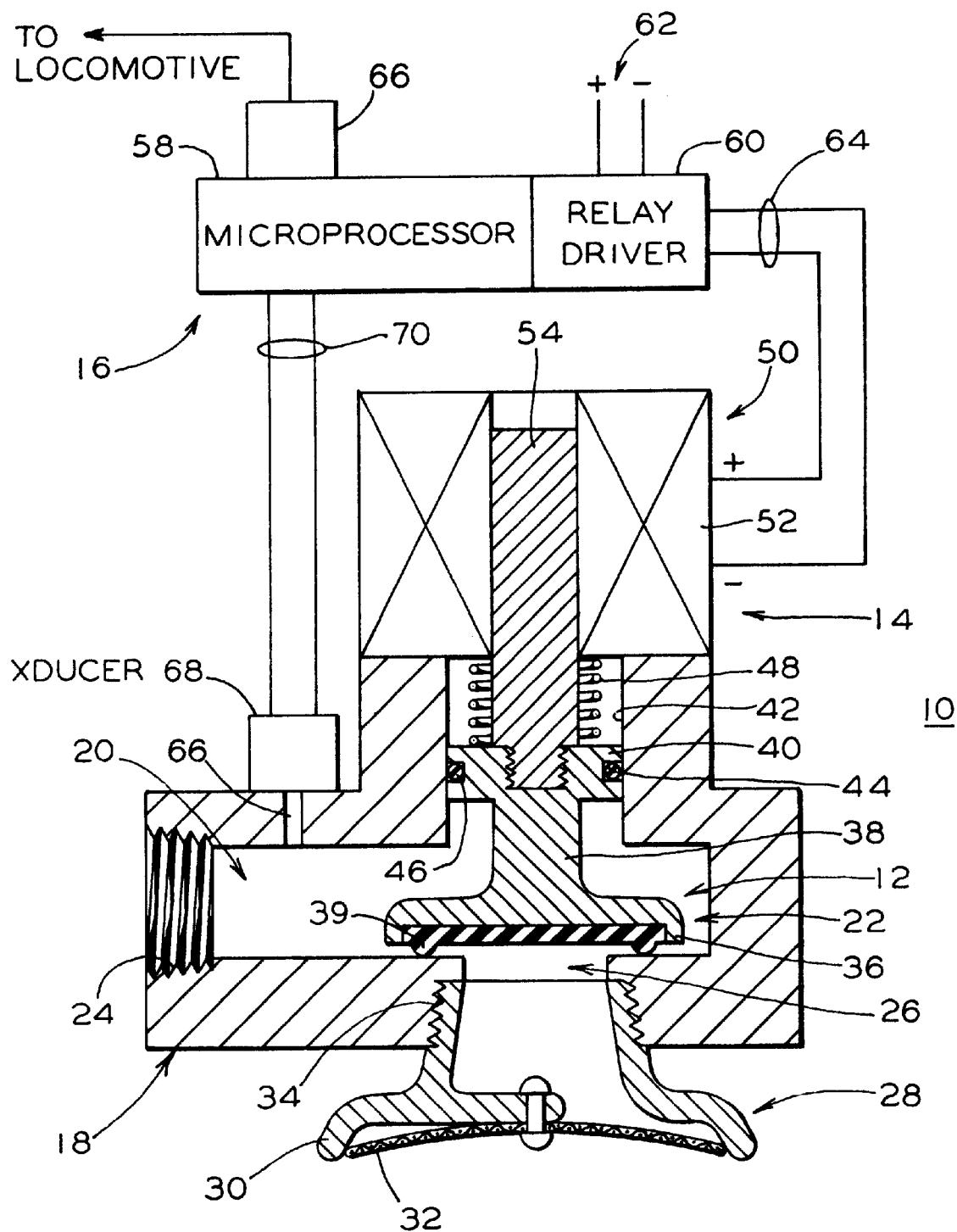
FIG. 1 is a cross-sectional elevational view of an electronic vent valve, constructed according to the present invention.

Prior to proceeding to a much more detailed description of the present invention, it should be noted that identical components which have identical functions have been identified with identical reference numerals throughout the several views illustrated in the drawing Figures for the sake of clarity and understanding of the invention.

Referring now to FIG. 1, an electronic vent valve constructed according to the present invention and designated by reference numeral 10 generally includes a valve 12, an electrically operated actuator 14 for moving the valve 12 between an open position and a closed position and a control circuit 16 for controlling the electrically operated actuator 14 so as to cause the electrically operated actuator 14 to move the valve 12 between the open and closed position in accordance with algorithmic procedures described more fully below. The valve 12 is itself contained within a valve housing 18 which has an internal cavity 20 within which is positioned a valve member 22. The valve housing 18 is provided with a preferably threaded female connection 24 for connecting to a threaded male fitting of a brake pipe of a pneumatic braking system. Preferably, the threaded connection 24 is a 1 and ¼ inch pipe thread connection. Due to such connection of the valve housing 18 to the brake pipe of the pneumatic braking system, the internal cavity 20 is maintained at substantially the brake pipe pressure.

The valve housing 18 is additionally provided with a vent orifice 26 that opens to the surrounding ambient atmosphere. Preferably, the vent orifice 26 is fitted with a vent protector 28 which has a horn portion 30 and a screen 32 for excluding insects and preventing debris from clogging the vent orifice 26. The vent protector 28 is preferably connected to the valve housing 18 via another threaded connection 34.

The valve member 22 includes a generally disk shaped valve portion 36 and a valve stem 38 extending therefrom. The generally disk shaped valve portion 36 is preferably provided with an raised annulus 39 which surrounds the vent orifice 26. An annular flange 40 extends radially from the valve stem 38 and slidingly contacts a bore 42 provided in the valve housing 18 opposite the vent orifice 26 such that the valve member 22 is free to slidingly reciprocate within the bore 42 thereby closing and opening the valve 12 by respectively blocking and unblocking the vent orifice 26. To maintain a pressure seal within the internal cavity 20, the annular flange 40 is provided with a peripheral groove 44. A resilient O-ring 46 is positioned within the peripheral groove 44. The valve 12 is biased by a preferably coiled spring member 48 towards a normally closed position shown in FIG. 1, wherein the raised annulus 39 of the generally disk shaped valve portion 36 is in contact with the interior wall of the internal cavity 20, thereby surrounding and effectively closing the vent opening 26.

The electrically operated actuator 14 for moving the valve 12 between the open and closed positions is preferably provided in the form of a solenoid 50 having a coil 52 and an armature 54 extending through the coil 52. The armature 54 is axially connected so as to extend the valve stem 38, for example, by a threaded connection 56. As is well known, energization of the coil 52 causes a movement of the armature 54 towards the center of the coil 52 and thus an upward movement (as viewed in FIG. 1) of the valve member 22 against the downward biasing force of the coil spring 48, thereby opening the vent orifice 26 to the ambient atmosphere.

The solenoid 50 can be selectively energized by the control circuit 16 which preferably includes a microprocessor 58 controlling a solid state relay driver 60. The solid state relay driver 60 receives electrical power to energize the solenoid 50 from positive and negative power connections 62 which are typically connected to the aforementioned electrical trainline which runs from railcar to railcar over the length of the train. Typically, such an electrical trainline will include a 74 volt direct current power supply line. The solid state relay driver 60 selectively energizes the solenoid coil 52 as directed by the microprocessor 58 through electrical leads 64. The microprocessor 58 itself is also connected to the electrical trainline by a communication port 66 through which the microprocessor 58 receives data from the previously mentioned master controller typically located in the lead locomotive. Preferably, the communication port is an RS422 communication port well known in the microprocessor arts.

The valve housing 18 is further provided with another orifice 66 to which there is affixed a pressure transducer 68, such pressure transducers being well known in the electronic arts. The pressure transducer 68 may be digitally implemented or may alternatively be supplied as an analog pressure transducer coupled with an analog to digital converter so as to provide digital signals indicative of the pressure within the internal cavity 20 of the housing 18 which, as noted above, is the brake pipe pressure. Repeated digital signals from the pressure transducer 68 indicative of the brake pipe pressure are transmitted to the microprocessor 58 through at least a pair of signal leads 70 (e.g., signal and ground).

It will be appreciated that the electronic vent valve 10 as described above can be selectively opened to ambient atmosphere through actuation of the solenoid 50 by the microprocessor 58 and that the microprocessor 58 can on a repetitively updated basis monitor the pressure within the interior chamber 20, i.e., the brake pipe pressure. We now turn to a more detailed description of the algorithmic procedures implemented in the functioning of the microprocessor 58 and illustrated in FIGS. 2–4.

Figure 2:
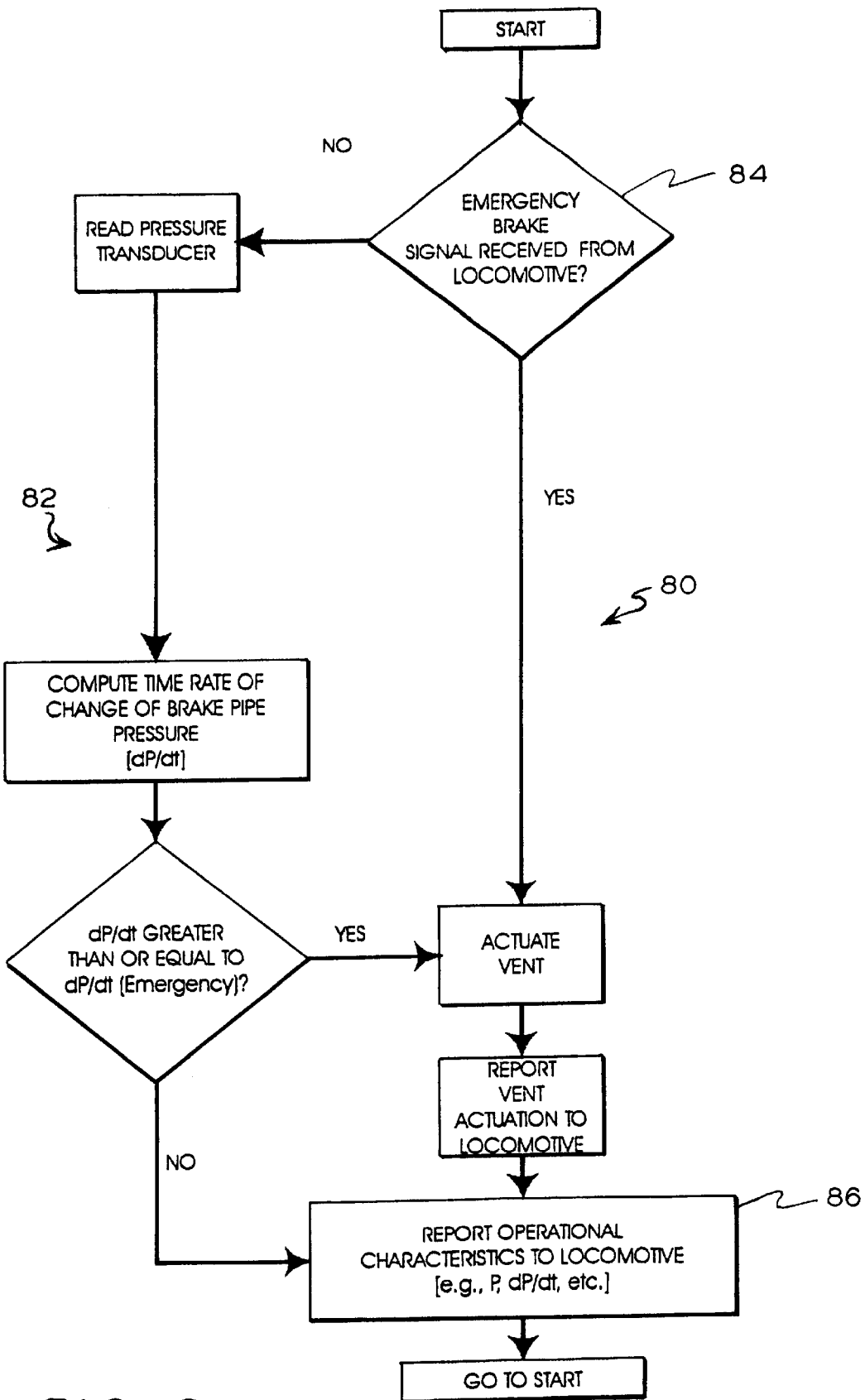
FIG. 2 is a flow chart showing a first embodiment of an algorithmic procedure implemented by a microprocessor component of the electronic vent valve of FIG. 1.

FIG. 2 illustrates a first embodiment of algorithmic procedures implemented in the microprocessor 58. This first embodiment has two main branches 80 and 82, depending upon whether or not an emergency brake signal has been received by the microprocessor 58 (e.g., through the electrical trainline) from the master controller located in the locomotive. If, at decision point 84, an emergency brake signal has been received from the locomotive, then in branch 80 the microprocessor 58 (in FIG. 1) actuates the solenoid 50 to immediately move the valve 12 to the open position, thereby causing a rapid decrease in the brake pipe pressure. As noted above, the AB-Type control valves located on each railcar react to a precipitous drop in the brake pipe pressure by transferring compressed air from both the auxiliary and emergency reservoirs to the brake cylinders. The microprocessor 58 additionally reports the occurrence of the vent actuation to the locomotive via the RS422 communications port 66.

If, at decision point 84 an emergency brake signal has not been received from the locomotive, then in branch 82 the microprocessor 58 reads the current brake pipe pressure via the pressure transducer 68, computes the rate of change with respect to time of the brake pipe pressure dP/dt and determines whether the computed rate of change of pressure dP/dt is greater than or equal to a threshold value dP/dt (Emergency). If the threshold is met or exceeded, the valve 12 is again immediately moved to the open position to rapidly drop the brake pipe pressure.

Regardless of whether the valve 12 has been opened, during each iteration the microprocessor 58 typically reports at 86 to the master controller various operational characteristics such as, for example, the current pressure being read by the pressure transducer 68 and the most recently computed rate of change of brake pipe pressure dP/dt, as well as any other desired operational characteristics of the microprocessor 58 itself. The operational characteristics reported at 86 need not be reported immediately to the master controller, but can be saved in a register to be reported to the master controller in response to a polling operation periodically conducted by the master controller, if so desired.

Figure 3:
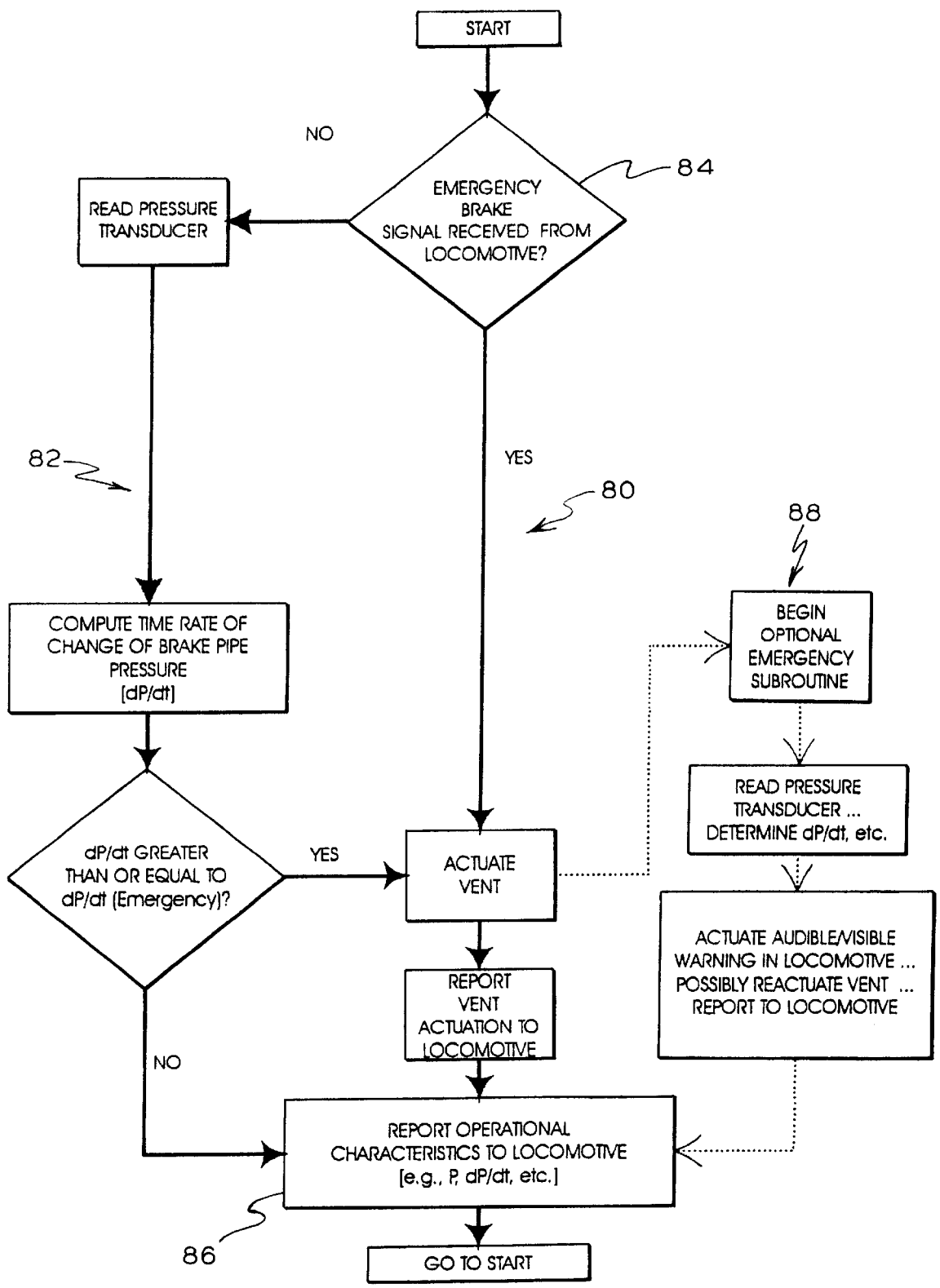
FIG. 3 is a flow chart showing a second embodiment of an algorithmic procedure implemented by a microprocessor component of the electronic vent valve of FIG. 1.

FIG. 3 illustrates a second embodiment of algorithmic procedures which may be implemented in the microprocessor 58. In addition to the two branches 80 and 82 shown in FIG. 2, the algorithm of FIG. 3 contains an optional emergency subroutine 88, which may be incorporated to refine the procedures carried out whenever the valve 12 has been opened due to an emergency braking condition having been determined. The emergency braking condition may have been commanded by the master controller via the RS422 communication port 66 or the emergency braking condition may have been independently initiated by the microprocessor 58 itself due to the calculated dP/dt having exceeded the determined threshold value.

During the optional emergency subroutine 88, the microprocessor 58 determines whether the valve 12 has in fact opened after the microprocessor 58 has actuated the solenoid 50 to cause an opening of the valve 12. For example, by repeatedly reading the pressure transducer 68 the microprocessor 58 can determine whether the pressure within the interior cavity 20 of the housing 18 is falling sufficiently rapidly to indicate that the valve 12 has in fact been actuated to the open position. As part of such a check, the microprocessor 58 can calculate dP/dt to determine if the rate of change of the brake pipe pressure is sufficiently great to indicate that the valve 12 has actually opened. Additionally, the microprocessor 58 can report back to the master controller via the RS422 communications port 66 whether the valve 12 has in fact opened and can actuate an audible and/or visible warning in the locomotive if the valve 12 has failed to open properly. Still further, the microprocessor 58 can attempt to reopen the valve 12. Various optional emergency measures may be taken as appropriate.

Figure 4A:
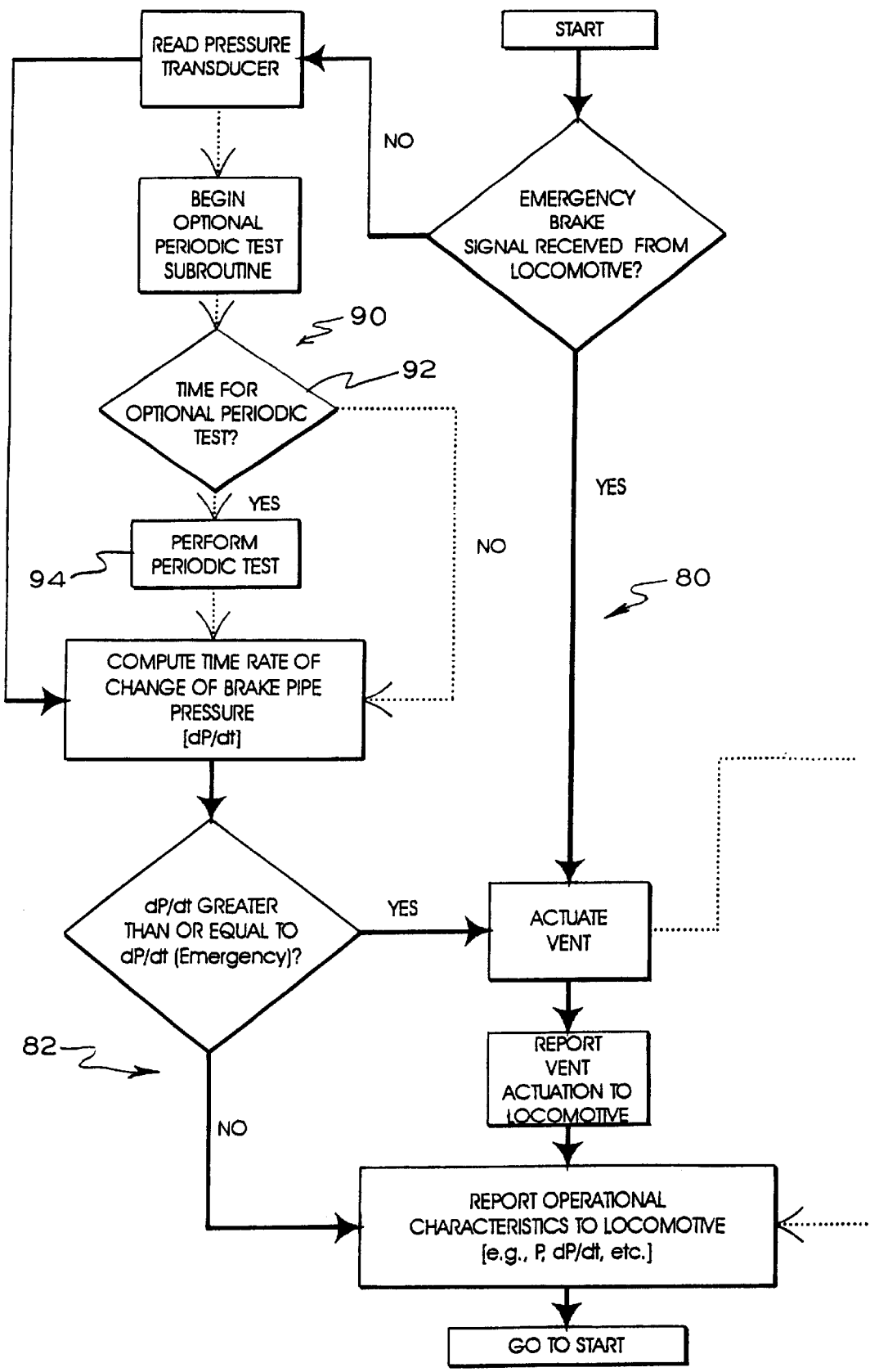
FIG. 4 is a flow chart showing a third embodiment of an algorithmic procedure implemented by a microprocessor component of the electronic vent valve of FIG. 1.
Figure 4B:
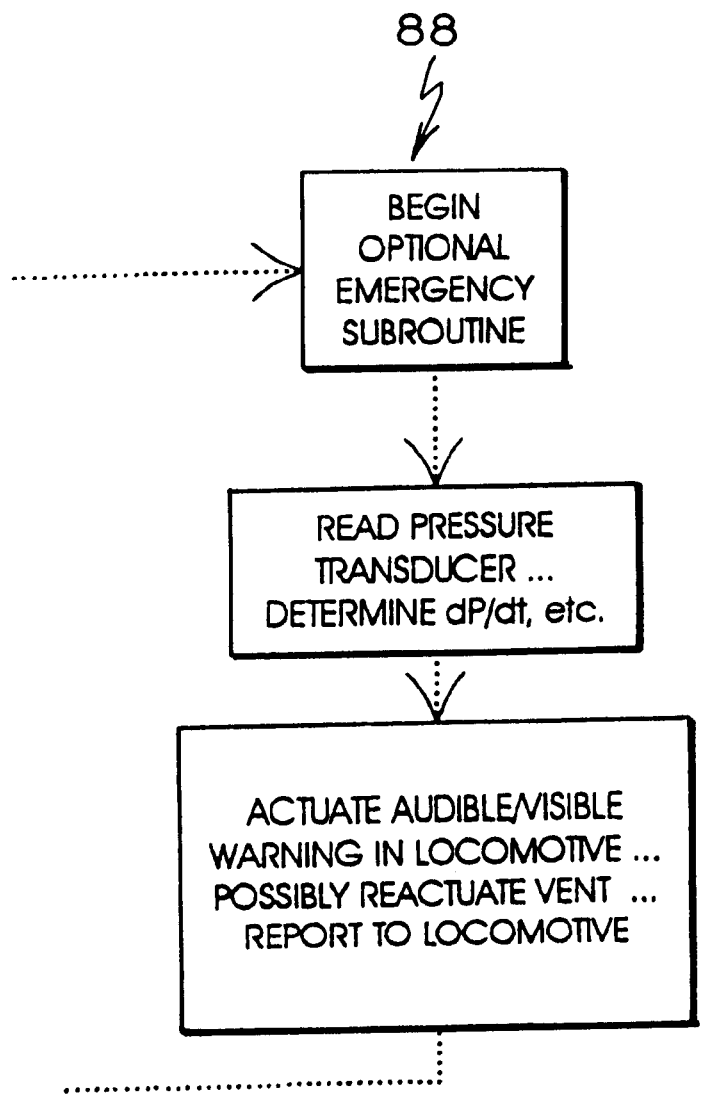

FIG. 4 illustrates a third embodiment of algorithmic procedures which may be implemented in the microprocessor 58. In the embodiment of FIG. 3, the two main branches 80 and 82 of FIGS. 2 and 3 are shown, together with the optional emergency subroutine 88 of FIG. 3. Additionally, FIG. 4 shows how an optional periodic test subroutine 90 can be incorporated into the inventive algorithm. In the optional periodic test subroutine 90, a periodic timing function 92, which may be, for example, a hardware or software implemented register, determines when a periodic operational test of the electronic vent valve is to be conducted at 94. The periodic test conducted at 94 may be, for example, any of a number of self-testing/self-diagnostic subroutines performed by the microprocessor 58 which are well known and understood by those of ordinary skill in the microprocessor arts. For example, one such self-testing subroutine which may be performed by the microprocessor 58 is a testing for proper functioning of the random access memory (RAM) associated with the microprocessor 58.

While the present invention has been described by way of a detailed description of a number of particularly preferred embodiments, it will be apparent to those of ordinary skill in the art that various substitutions of equivalents may be affected without departing from the spirit or scope of the invention as set forth in the appended claims.

I claim:

1. An electronically controlled vent valve for a pneumatic brake system, such pneumatic brake system including a master controller processing circuit for generating electrical braking command signals and a brake pipe carrying compressed air, said electronically controlled vent valve comprising:

a valve housing:

a valve disposed within said valve housing for connecting to such brake pipe and for being in fluid communication with such compressed air carried by such brake pipe;

said valve having an open position for substantially venting such compressed air from such brake pipe and a closed position for substantially retaining such compressed air within such brake pipe;

a brake pipe pressure sensor disposed on and connected to said valve housing and in fluid communication with an interior of said valve for generating brake pipe pressure signals indicative of such pressure of such compressed air in such brake pipe;

an electrically operated actuator for moving said valve between said open position and said closed position; and a microprocessor for controlling said electrically operated actuator to move said valve between said open position and said closed position;

said microprocessor including:

means for moving said valve between said open position and said closed position in response to an emergency electrical braking command signal generated by such master controller processing circuit; and emergency pressure monitoring means for calculating a rate of change of said brake pipe pressure signals generated by said brake pipe pressure sensor and for controlling said electrically operated actuator to move said valve to said open position to substantially vent such compressed air from such brake pipe when said calculated rate of change of said brake pipe pressure signals exceeds a threshold value;

said threshold value corresponding to an emergency rate of change of said brake pipe pressure.

2. An electronically controlled vent valve for a pneumatic brake system, according to claim 1, wherein such pneumatic braking system additionally includes:

a communication circuit for transferring data between such master controller processing circuit and said microprocessor.

3. An electronically controlled vent valve for a pneumatic brake system, according to claim 1, wherein:

said microprocessor additionally includes reporting means, for transmitting to such master controller processing circuit of such pneumatic brake system through said communication circuit, at least one of:

a signal representing actuation of said vent by said electrically operated actuator;

a signal representing said brake pipe pressure signals; and a signal representing said calculated rate of change of said brake pipe pressure signals.

4. An electronically controlled vent valve for a pneumatic brake system, according to claim 1, wherein:

said microprocessor additionally includes means for transmitting to such master controller processing circuit of such pneumatic braking system over said communication circuit at least one operational characteristic of said microprocessor.

5. An electronically controlled vent valve for a pneumatic brake system, according to claim 1, wherein said microprocessor additionally includes emergency subroutine means for performing at least one of the following actions:

a) actuating at least one of an audible signal and a visible signal; and b) controlling said electrically operated actuator to move said valve to said open position.

6. An electronically controlled vent valve for a pneumatic brake system, according to claim 1, wherein:

said microprocessor includes means for testing actuation of said vent by said electrically operated actuator.

7. An electronically controlled vent valve for a pneumatic brake system, according to claim 1, wherein said electrically operated actuator includes a solenoid for moving said valve between said open position and said closed position and a relay driver, said relay driver being operable to drive said solenoid in accordance with signals generated by said microprocessor.

8. An electronically controlled vent valve for a pneumatic brake system, according to claim 1, wherein said microprocessor includes periodic test means for performing a periodic self test of the operational status of said microprocessor.

9. An electronically controlled vent valve for an electronically controlled pneumatic braking system, such electronically controlled pneumatic braking system having a plurality of braking sites at which a braking force can be applied, such electronically controlled pneumatic braking system including a master controller processing circuit for generating and supplying electrical braking command signals and an individual braking control unit located proximate each of such plurality of braking sites for receiving such electrical braking command signals generated and transmitted by such master controller processing circuit, such electronically controlled pneumatic braking system further including a brake pipe supplying compressed air to such plurality of braking sites, said electronically controlled vent valve comprising:

a valve housing for connecting to such brake pipe and for receiving such compressed air from such brake pipe;

a valve member disposed within said valve housing;

said valve member having an open position for substantially venting such compressed air from said valve housing and a closed position for substantially retaining such compressed air within said valve housing;

a brake pipe pressure sensor disposed on and connected to said valve housing and in fluid communication with an interior of said valve for generating brake pipe pressure signals indicative of such pressure of such compressed air in such brake pipe;

electrically operated actuation means for moving said valve member between said open and closed positions; and a microprocessor, said microprocessor including:

direct vent actuation means for causing said electrically operated actuation means to move said valve member to said open position in response to an emergency electrical braking command signal generated by and received from said master controller processing circuit; and emergency pressure monitoring means for monitoring a rate of change of said brake pipe pressure signals generated by said brake pipe pressure sensor and for causing said electrically operated actuation means to move said valve member to said open position to substantially vent such compressed air from such brake pipe when said rate of change of said brake pipe pressure monitored by said microprocessor is beyond a threshold value;

said threshold value corresponding to an emergency rate of change of said brake pipe pressure.

10. An electronically controlled vent valve for an electronically controlled pneumatic braking system, according to claim 9:

wherein said electronically controlled vent valve additionally comprises electrical communication means for communicating electrical braking signals between said microprocessor and such master controller processing circuit of such electronically controlled pneumatic braking system.

11. An electronically controlled vent valve for a pneumatic brake system, according to claim 9, wherein said microprocessor further includes reporting means for transmitting to such master controller processing circuit of such electronically controlled pneumatic brake system through said electrical communication means at least one of:

a signal representing movement of said valve member to said open position by said electrically operated actuation means;

a signal representing said brake pipe pressure signals;

a signal representing said monitored rate of change of said brake pipe pressure signals; and a signal representing an operational characteristic of said microprocessor.

12. An electronically controlled vent valve for a pneumatic brake system, according to claim 9, wherein said emergency pressure monitoring means further includes means for actuating at least one of an audible signal and a visible signal.

* * * * *